UNITED STATES PATENT OFFICE.

LYMAN P. CONVERSE, OF CHICAGO, ILLINOIS, ASSIGNOR TO THE WATER-PROOF FABRIC COMPANY, OF NEW YORK.

SUBSTANCE FOR RENDERING FABRICS WATER-PROOF.

SPECIFICATION forming part of Letters Patent No. 295,113, dated March 11, 1884.

Application filed August 22, 1882. Renewed February 12, 1884. (Specimens.)

*To all whom it may concern:*

Be it known that I, LYMAN P. CONVERSE, a citizen of the United States, and a resident of Chicago, in the county of Cook and State of Illinois, have invented a certain new and useful Substance for Rendering Fabrics and other Materials Water-Proof, of which the following is a specification.

My invention contemplates the production of a substance impervious to moisture, which, when applied to fabrics, will not injure them, and which will remain soft, flexible, and pliant, not be rendered sticky by heat, nor otherwise injuriously affected when subjected to moderate extremes of temperature. This end I attain by boiling linseed-oil at a temperature of about 450° Fahrenheit from six to ten hours, according to the quantity operated upon at one time; then gradually raising the temperature to at least 620°, and preferably to about 700° Fahrenheit; then allowing it to remain at this high temperature for a short time—say from fifteen to thirty minutes. I find the result of this treatment to be the production of a substance possessing qualities different in kind from any product heretofore known to me, it being soft and pliable, unaffected by heat or cold, and deprived of any sticky or resinous quality. When applied to fabrics in usual well-known ways, it offers a soft, pliant, waterproofing material, possessing many of the qualities of rubber or gutta percha, and yet free from the offensive odors incident to vulcanizing those substances. After being heated to from 620° to 700° Fahrenheit, as before explained, the oil may be allowed gradually to cool down and applied to fabrics, as above stated; or when it has cooled down to a temperature of, say, 150° Fahrenheit, it may be mingled with other substances.

I have found the adhesiveness of the compound to the fabric to be increased by adding about a pint of copal-varnish to each gallon of the oil.

The color of the compound, which is that of the natural linseed-oil, may be varied by the addition of the usual pigments, the proportion of the pigment being varied according to the color desired. This substance may be applied independently or in combination with the other ingredients specified for coating any surface which it is desired to render water-proof; but its special value is for rendering fabrics impervious to moisture. It may be applied to cloths and like materials by means of a brush or other suitable well-known means; but, preferably, when applied in quantities, it is spread, while cold, upon the cloth by means of a knife spreading-machine of well-known construction, after which it is dried in a heated room or by exposure to the sun.

I am aware that it has heretofore been proposed to boil linseed-oil at a temperature as high as 520° Fahrenheit; but my experience has demonstrated that such temperature is insufficient to effect the change in the properties of the oil which I desire, and which are herein set forth.

I claim as my invention—

1. The process herein described of producing a pliable waterproofing compound unaffected by variations of temperature, which process consists in boiling linseed-oil at a temperature of from 620° to 700° Fahrenheit, as hereinbefore set forth.

2. As a new article of manufacture, a pliable water-proof substance unaffected by variations of temperature, consisting of linseed-oil boiled at a temperature of from 620° to 700° Fahrenheit.

3. The hereinbefore-described waterproofing compound, consisting of linseed-oil which has been independently boiled at a temperature of between 620° to 700° Fahrenheit, combined with copal-varnish and a pigment, substantially as hereinbefore set forth.

In testimony whereof I have hereunto subscribed my name this 19th day of August, A. D. 1882.

LYMAN P. CONVERSE.

Witnesses:
DANIEL W. EDGECOMB,
NELSON ZABRISKIE.